(12) United States Patent
Hall

(10) Patent No.: US 6,188,387 B1
(45) Date of Patent: *Feb. 13, 2001

(54) COMPUTER INPUT PERIPHERAL

(75) Inventor: John C. Hall, Redmond, WA (US)

(73) Assignee: Microsoft Corporation, Redmond, WA (US)

(*) Notice: Under 35 U.S.C. 154(b), the term of this patent shall be extended for 0 days.

This patent is subject to a terminal disclaimer.

(21) Appl. No.: 09/192,870

(22) Filed: Nov. 16, 1998

Related U.S. Application Data

(63) Continuation of application No. 08/947,044, filed on Oct. 8, 1997, now Pat. No. 5,838,304, which is a continuation of application No. 07/825,652, filed on Jan. 23, 1992, now abandoned, which is a division of application No. 07/626,393, filed on Dec. 10, 1990, now Pat. No. 5,125,077, which is a continuation of application No. 07/568,057, filed on Aug. 16, 1990, now abandoned, which is a continuation of application No. 07/371,529, filed on Jun. 26, 1989, now abandoned, which is a division of application No. 07/119,314, filed on Nov. 9, 1987, now Pat. No. 4,866,602, which is a continuation of application No. 06/548,122, filed on Nov. 2, 1983, now abandoned.

(51) Int. Cl.[7] ....................................... G06F 3/033
(52) U.S. Cl. .................. 345/157; 345/163; 340/825.21; 710/1
(58) Field of Search ................ 340/825.21, 825.44, 340/825.2; 345/145, 157, 163; 710/1

(56) References Cited

U.S. PATENT DOCUMENTS

| | | |
|---|---|---|
| 3,613,090 | 10/1971 | Mason . |
| 3,625,083 | 12/1971 | Bose . |
| 3,643,148 | 2/1972 | Brown et al. . |
| 3,732,557 | 5/1973 | Evans et al. . |
| 3,739,347 | 6/1973 | Forsberg . |
| 3,789,218 | 1/1974 | Blount . |
| 3,852,721 | 12/1974 | Tucker et al. . |
| 3,911,419 | 10/1975 | Bates et al. . |
| 4,272,758 | 6/1981 | Giraud . |
| 4,292,474 | 9/1981 | Morrell et al. . |
| 4,298,957 | 11/1981 | Duvall et al. . |
| 4,303,914 | 12/1981 | Page . |
| 4,370,648 | 1/1983 | Wagner et al. . |
| 4,375,103 | 2/1983 | Arneth et al. . |
| 4,390,873 | 6/1983 | Kirsch . |
| 4,390,967 | 6/1983 | Eglowstein et al. . |
| 4,514,726 | 4/1985 | Whetstone et al. . |
| 4,518,961 | 5/1985 | Davis et al. . |
| 5,125,077 | 6/1992 | Hall . |

FOREIGN PATENT DOCUMENTS 56-104561   8/1981   (JP) .

OTHER PUBLICATIONS

"Mouse P–4 Interactive Graphic Input Device," Le Lieu, Switzerland, Feb. 23, 1982.
Biancomano, "Personal Computer Keyboards," Electronic Design, Sep. 29, 1983.
Fields, "Mouse Tracks Path By Electronics Only," Electronics, Oct. 20, 1982, pp. 48–49.

*Primary Examiner*—Jack M. Choules
(74) *Attorney, Agent, or Firm*—Klarquist Sparkman Campbell Leigh & Whinston, LLP

(57) ABSTRACT

Data is transmitted from a mouse to a host computer in accordance with a 3-byte packet protocol. The first byte includes bits indicating the status of first and second buttons on the mouse. The first bit of each byte serves as a sync bit. The sync bit has a value of "1" in the first byte and a value of "0" in each of the second and third bytes. Data representing movement of the mouse in two dimensions is encoded as two 8-bit twos-complement integers which are transmitted as part of the three-byte packet.

2 Claims, 2 Drawing Sheets

| | B6 | B5 | B4 | B3 | B2 | B1 | B0 |
|---|---|---|---|---|---|---|---|
| Byte 1 | 1 | LEFT | RIGHT | Y7 | Y6 | X7 | X6 |
| Byte 2 | 0 | X5 | X4 | X3 | X2 | X1 | X0 |
| Byte 3 | 0 | Y5 | Y4 | Y3 | Y2 | Y1 | Y0 |

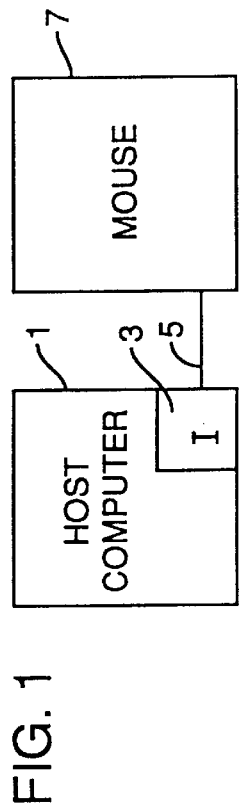
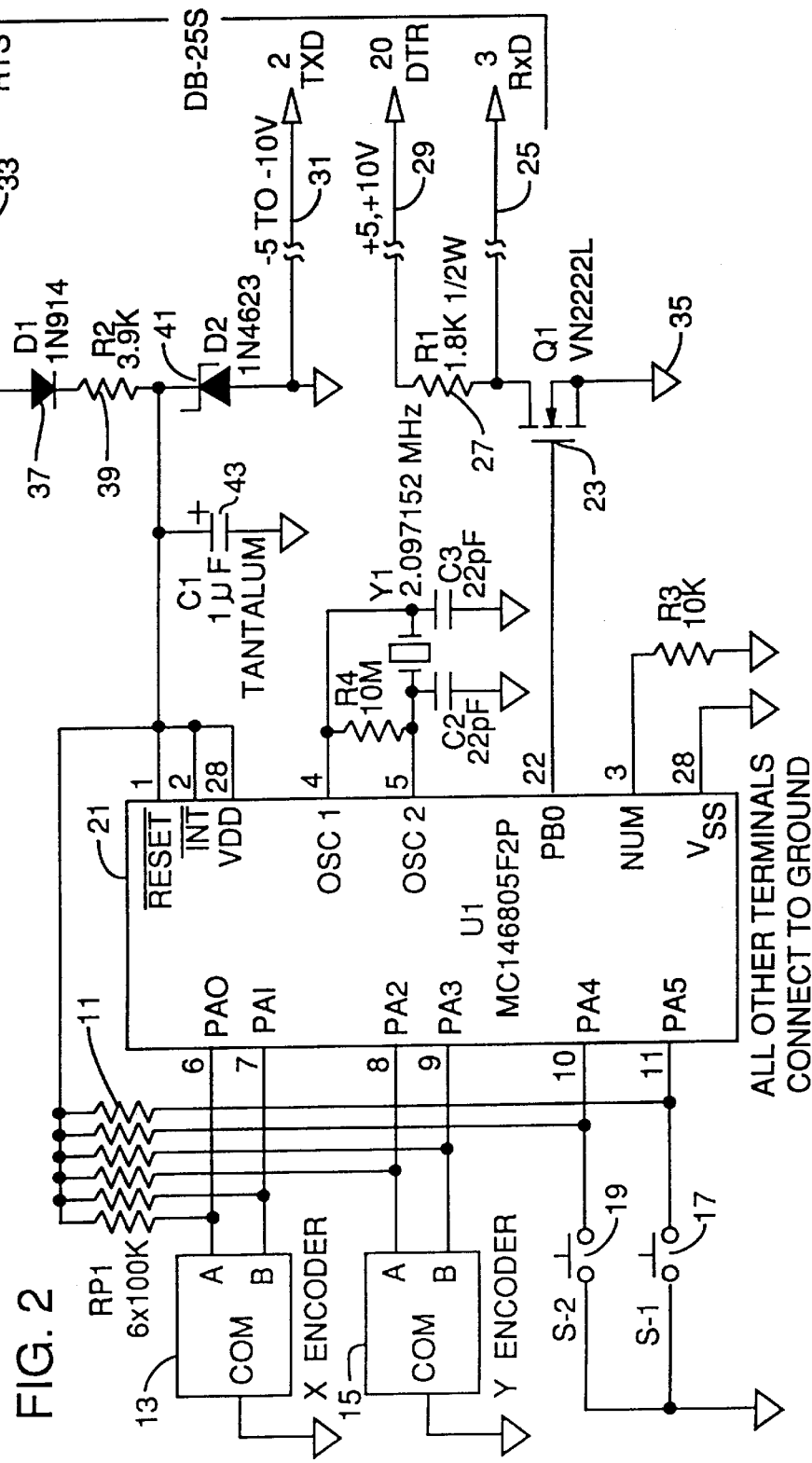
FIG. 1
FIG. 2

FIG. 3

|  | B6 | B5 | B4 | B3 | B2 | B1 | B0 |
|---|---|---|---|---|---|---|---|
| Byte 1 | 1 | LEFT | RIGHT | Y7 | Y6 | X7 | X6 |
| Byte 2 | 0 | X5 | X4 | X3 | X2 | X1 | X0 |
| Byte 3 | 0 | Y5 | Y4 | Y3 | Y2 | Y1 | Y0 |

COMPUTER INPUT PERIPHERAL

RELATED APPLICATION DATA

This application is a continuation of allowed application Ser. No. 08/947,044, filed Oct. 8, 1997, now U.S. Pat. No. 5,838,304 which is a continuation of abandoned application Ser. No. 07/825,652, filed Jan. 23, 1992, which is a division of application Ser. No. 07/626,393, filed Dec. 10, 1990 (now U.S. Pat. No. 5,125,077), which is a continuation of abandoned application Ser. No. 07/568,057, filed Aug. 16, 1990, which is a continuation of abandoned application Ser. No. 07/371,529, filed Jun. 26, 1989, which is a division of application Ser. No. 07/119,314, filed Nov. 9, 1987 (now U.S. Pat. No. 4,866,602), which is a continuation of abandoned application Ser. No. 06/548,122, filed Nov. 2, 1983. The disclosures of the foregoing allowed and issued applications are incorporated by reference.

BACKGROUND OF THE INVENTION

1. Field of the Invention

This invention relates to a computer graphic input device known as a mouse and, more specifically, to a power supply for such device.

2. Description of the Prior Art

A mouse is a computer input device typically used for positioning a cursor on a computer video display screen. A typical physical embodiment of a mouse includes a small enclosure containing X-Y motion sensors, one or more push buttons operable externally of the enclosure, electrical interface circuitry, and a cable to connect the circuitry to a host computer. In operation, when the mouse is moved on a flat surface by a user, the motion sensors in the mouse detect the movement and direction of the mouse in the X-Y plane. The interface circuitry, typically within the mouse, converts the motion data produced by the sensors into a digital form usable by the host computer. Software in the host computer then utilizes the motion data to perform a particular function, for example, repositioning of the cursor on the display screen. The mouse also usually is provided with one or more switches, often in the form of push buttons, to enable alteration of the program flow in the host computer.

Mice of the above described type are normally classified by the manner in which motion is detected, the principal motion detection methods being mechanical and optical. Mechanical mice usually employ a technique whereby a spherical ball protrudes slightly below the bottom of the mouse enclosure which is free to roll as the mouse is moved by the operator along a flat surface. Inside the enclosure, the rotating ball is coupled to a pair of orthogonally mounted shaft position encoders by small rubber wheels or the like. Mouse motion is thereby converted into two pairs of quadrature signals, one pair for each axis of motion, thereby providing the required direction and displacement information corresponding to mouse movement. Optical mice utilize a method whereby a light source in the base of the mouse is reflected onto one or more photodetectors by a specially patterned surface over which the mouse is moved. Typically, a single chip computer translates the changes in detected luminance into direction and displacement signals which are utilized by the host computer in the manner described above.

Mice may be further classified by the manner in which they interface with the host computer. The two common interface methods are parallel and serial. Mice employing a parallel interface usually connect to a specially designed, dedicated controller board installed in the host computer. The circuitry used to convert motion of the mouse into digital data may be located either on the controller board in the host computer, in the mouse itself, or divided between the two. In any event, the controller board provides the interconnection between the host computer and the mouse.

On the other hand, mice employing a serial interface typically are connected to a general purpose serial I/O port on the host computer of the type often used with other peripheral devices such as modems. One advantage of a serial mouse is that no special mouse controller board is required in the host computer to support operation of the mouse. As a consequence, all circuitry used in translating motion of the mouse into digital form is contained within the mouse itself, or within an additional enclosure external to the host computer.

The serial mouse typically utilizes a microcomputer, often with several discrete components, to translate the quadrature signals of the shaft encoders or the optical sensors into data packets that are transmitted to the host computer. Additionally, there is circuitry to perform the signal level conversion required by the serial interface standard employed (usually EIA Standard RS-232C). Data is commonly transmitted using an ordinary asynchronous serial protocol. Serial mice require an external power source, such as batteries or an externally located power supply connected to the mouse by a cable. Use of power supplied by batteries is inconvenient because of size and weight considerations, as well as the fact that the supply of power is dependent on battery life. On the other hand, the use of an externally located power supply usually requires an extra enclosure that must be connected to the primary AC power lines, as well as an additional cable to supply the power to the mouse. Both of these methods result in additional cost and complexity.

SUMMARY OF THE INVENTION

The invention overcomes the above problems by obtaining power for the mouse directly through signal lines normally used for other purposes but which form a part of the standard RS-232C serial interface. The serial mouse utilizes the RTS (Request to Send), DTR (Data Terminal Ready) and TXD (Transmit Data) signal lines of the hose computer's RS-232C serial I/O interface as its power source. These lines, as defined by EIA Standard RS-232C, are normally used for data communication and handshake functions under control of the host computer, and are not intended to provide electrical power to any peripheral device attached thereto. However, in accordance with EIA Standard RS-232C, these signal lines are energized by line drivers capable of sourcing a few milliamperes of current at a minimum of 5 volts into a 3000 ohm load. The serial mouse of this invention is able to obtain all required electrical power through these three signal lines.

Because the above noted signals are available on the serial I/O ports of substantially all micro and mini computers, the serial mouse of this invention may be directly connected to the host computer interface without hardware modification, an external power source, or internal batteries. A software driver in the host computer is used to properly configure the control lines on the host computer serial interface.

BRIEF DESCRIPTION OF THE DRAWINGS

FIG. 1 is a block diagram showing a host computer with a mouse connected to a serial interface which is a part of the host computer; and FIG. 2 is a schematic diagram of a serial mouse in accordance with the present invention.

FIG. 3 is a drawing showing the arrangement of bits, within a 3-byte packet, according to a preferred embodiment of the present invention.

DESCRIPTION OF THE PREFERRED EMBODIMENT

FIG. 1 is a block diagram of a host computer 1 with an interface 3 which is connected by a cable 5 to a mouse 7. The host computer 1 includes a display device, usually a cathode ray tube, which is controlled by signals transmitted from the mouse through the cable 5 and the unmodified interface 3 to the host computer 1. The mouse 7 receives power for its operation via the unmodified interface 3 and along certain standard signal wires of the cable 5. In the preferred embodiment these signals are transmitted in accordance with the format defined by EIA Standard RS-232C.

In operation, in the preferred embodiment, the serial mouse sends a three-byte data package to the host computer whenever there is any change in the state of the mouse. A change of state is defined as any motion of the mouse or any change in the position of either of its buttons. The data packet sent to the host computer is an accumulation of all mouse activity that has occurred since transmission of the previous data packet. In other words, any mouse activity that occurs during the transmission of one data packet or thereafter will be accumulated for transmission in the succeeding data packet. This buffering technique allows the serial mouse to continuously track high mouse velocities while transmitting serially at a low baud rate, for example, 1200 baud. In the preferred embodiment each data packet sent by the mouse comprises three bytes. The format for each byte is:

|        | B6 | B5   | B4    | B3 | B2 | B1 | B0 |
|--------|----|------|-------|----|----|----|----|
| Byte 1 | 1  | LEFT | RIGHT | Y7 | Y6 | X7 | X6 |
| Byte 2 | 0  | X5   | X4    | X3 | X2 | X1 | X0 |
| Byte 3 | 0  | Y5   | Y4    | Y3 | Y2 | Y1 | Y0 |

| | |
|---|---|
| Bit 6 | (B6) is a sync bit, set for byte 1 of a data packet, reset otherwise. |
| LEFT | represents the state of the left mouse button; a one (1) indicates the button is down (depressed), a zero (0) indicates that the button is up (released). |
| RIGHT | represents the state of the right mouse button in the same manner as the left button. |
| X0–X7 | is a signed, two's complement integer that represents the relative displacement of the mouse in the X-coordinate direction since the last data transmission. A positive value indicates mouse movement to the right, negative values indicate motion to the left. |
| Y0–Y7 | is a signed, two's complement integer that represents the relative displacement of the mouse in the Y-coordinate direction since the last data transmission. A positive value indicates mouse movement downwards, negative values indicate motion upwards. |

FIG. 2 is a schematic drawing of the circuit of a serial mouse 7. The circuitry may be disposed either in the mouse housing, at the host computer 1 connected to the interface 3, or divided between the two, as desired. The mouse 7 includes an X shaft encoder 13, a Y shaft encoder 15, a pair of switches 17 and 19 and resistors 11 connected between a source of voltage (explained below) and each of the output terminals of the encoders 13 and 15 and the switches 17, 19. Although two switches are shown, the number of switches provided is arbitrary, but generally is a relatively small number to simplify operation of the mouse. The output terminals from each of the encoders 13, 15 and switches 17, 19 are connected to I/O ports PA0 to PA5 respectively of a microcomputer 21. The encoders and switches are also connected to a local ground. As explained below this local ground is different from the host computer ground. At least the encoders 13, 15, and the switches 17, 19, will be located in the mouse enclosure. All or part of the remaining circuitry can be located within the mouse enclosure, or at the host computer, connected to the mouse by a cable. The encoders 13, 15 are standard shaft encoders of a type that can be purchased from ALPS Electric or from other sources.

Microcomputer 21 is preferably an 8 bit CMOS Motorola MC 146805F2, as described in Motorola publication ADI-879, copyright 1982 by Motorola, Inc. The microcomputer is configured as specified in the above publication with the ROM of the microcomputer being configured according to the source code of the attached Appendix. The code shown in the Appendix, when loaded into the ROM, allows the microcomputer to understand the meaning of a high or low signal on any particular input line and to generate the digital code transmitted from the mouse to the host computer. Power to drive the microcomputer 21 is applied to terminal VDD which receives a positive voltage of about 4.3 volts with respect to VSS. VSS is the local ground, a voltage in the −5 to −10 volt range relative to the host computer ground. The clock rate of the microcomputer is determined by the crystal controlled circuit connected across the microcomputer OSC inputs, about 2.1 MHz in the preferred embodiment.

The host computer is programmed to normally place a voltage of plus 5 to 10 volts in the Request To Send (RTS) line 33 and the Data Terminal Ready (DTR) line 29 and a voltage of minus 5 to 10 volts on the Transmit Data (TXD) line 31. The Receive Data (RXD) line 25 transmits signals from the microcomputer 21 serially to the host computer 1 via the interface 3. This is accomplished by controlling the gate of transistor 23 via signals from the output PBO of the microcomputer. The voltage on line 25 will be effectively local ground (−5 to −10 volts with respect to host computer ground) if the transistor is conducting, or the voltage on line 29 (+5 to +10 volts with respect to host ground) if the transistor is not conducting. All ground terminals in the drawing are local ground. Thus the microcomputer ground VSS takes the voltage on line 31 which is a negative voltage relative to the host computer ground. This arrangement eliminates the necessity of an additional transistor for voltage referencing between the microcomputer and the host computer. All signals on lines 29, 31 and 33 are bipolar relative to the host computer ground.

In actual operation, under programmed control of the host computer, RTS line 33 will always be at a positive voltage TXD line 31 will always be at a negative voltage, and DTR line 29 will always be at a positive voltage. The voltages on lines 29, 31 and 33 are utilized in accordance with the present invention as a power source to provide power to the microcomputer 21 across VDD and VSS and to the transistor 23. Diode 37 is provided to prevent the supply voltage to the microcomputer 21 from becoming negative at VDD with respect to local ground. Resistor 39 is a current limiting resistor and Zener diode 41 establishes a voltage reference for the microcomputer 21. The capacitor 43 is a filter capacitor to remove ripple components.

It is apparent from the above description that lines 29, 31 and 33, which in the prior art are used only for signalling functions, have been utilized to provide a source of power to a mouse circuit without requiring changes at the host computer or the computer interface. The use of these lines eliminates the need for a separate power source for the mouse.

Although the invention has been described with respect to a specific preferred embodiment thereof, variations and modifications will be apparent to those skilled in the art. It is therefore the intention that the appended claims be interpreted as broadly as possible in view of the prior art to include all such variations and modifications.

What is claimed is:

1. A computer storage medium having instructions therein causing a microprocessor in a cursor control device to encode data from plural buttons and at least one position sensor into plural byte packets for transmission to an associated computer, each byte having a sync bit at an end thereof, the sync bit in the first byte having a value of "1" and the sync bit in succeeding bytes having a value of "0," wherein the first byte of the packet can be unambiguously distinguished from later bytes of the packet.

2. A computer storage medium having instructions therein causing a microprocessor in a cursor control device to encode data from plural buttons and at least one position sensor into plural byte packets for transmission to an associated computer, said packets representing relative displacement of the device in X- and Y-directions in signed two's complement form, the relative displacement in the X-direction being represented by bits X7, X6, X5, X4, X3, X2, X1, and X0, the relative displacement in the Y-direction being represented by bits Y7, Y6, Y5, Y4, Y3, Y2, Y1, and Y0, wherein the first byte includes bits X6, X7, Y6, and Y7 in sequence, the second byte includes bits X0–X5 in sequence, and the third byte includes bites Y0–Y5 in sequence, wherein the 8-bit representations of the relative displacements fit into bytes of less than eight bits.

* * * * *